MODIFIED MANNITOL FOR PHARMACEUTICAL TABLETS

Herbert A. Lieberman, Livingston, Daniel J. Maher, Morristown, Ranjit Malani, East Orange, and Morton W. Scott, Palisades Park, N.J., assignors to Warner-Lambert Pharmaceutical Company, Morris Plains, N.J., a corporation of Delaware
No Drawing. Filed Oct. 31, 1961, Ser. No. 148,864
8 Claims. (Cl. 167—82)

The present invention relates to the treatment of mannitol and relates more particularly to the modification of the physical characteristics of mannitol by spray drying as well as by spray drying and coating procedures, and to the improved mannitol obtained by said treatment.

An object of this invention is the provision of a process for the treatment of mannitol powder whereby the physical characteristics of said mannitol powder are modified and improved flow and compression characteristics are imparted thereto.

Another object of this invention is the utilization of said improved mannitol in the preparation of dry powder blends useful in various applications such as tableting and other procedures whereby improved, free-flowing compositions including said modified mannitol are obtained and may be further processed easily and conveniently.

A further object of this invention is the preparation of tableting compositions which include said improved mannitol and which require a minimum of processing and a minimum quantity of added lubricant in order to be compressible by the usual procedures.

Other objects of this invention will appear from the following detailed description.

Mannitol is a commercially available hexahydric alcohol which occurs in nature and may readily be separated from many plant sources. Mannitol may be extracted from manna by the use of hot alcohol or other selective solvent. It is commonly obtained in the form of a white crystalline powder. Mannitol is produced synthetically by the reduction of mannose or glucose. The reduction may be carried out catalytically employing hydrogen and a nickel catalyst or it may be effected electrolytically. When carried out catalytically the monosaccharide or mixture of monosaccharides employed is converted to an aqueous slurry and is then hydrogenated under pressure in the presence of the nickel catalyst. The spent catalyst is separated by filtration and regenerated. The solution or filtrate is decolorized with activated carbon and then purified by ion exchange and the mannitol formed is separated from solution by fractional crystallization and then further purified by recrystallization from aqueous solution. After the mannitol is dried it is then ground to a powder of the desired mesh.

The mannitol thus obtained is extensively employed in pharmaceutical tablet formulations as a filler and also because of the desirable taste and smooth texture it imparts to chewable tablets which include mannitol as a component. One of the difficulties experienced when including mannitol in pharmaceutical formulations is that it hinders the free flow of the formulation to the tablet dies. Also, in the ordinary form in which mannitol is available it does not have good compression characteristics and when in this form cannot be used in the concentrations normally required to obtain its advantages and yet yield satisfactory tablets which can be produced at a reasonable rate of production. In order to overcome these difficulties, involved and time-consuming granulation procedures are employed when mannitol is employed as a component in a tableting composition and this also includes the use of appreciable quantities of tableting lubricants in forming the granulation. While these expedients are of help in producing reasonably satisfactory granulations containing mannitol they do involve extensive manipulative procedures which greatly limit the ease and convenience of employing mannitol in the usual tableting compositions. In addition, some degree of impairment in stability may result from these modified granulation procedures.

We have now found that if a solution of mannitol in a volatile solvent or mixture of volatile solvents is spray dried employing a heated inert gaseous medium to remove the solvent the mannitol is converted directly to a free-flowing physical form which when incorporated in the usual tableting compositions allows the latter to flow freely when fed to the dies of a tableting press. Preferably, for maximum production, we employ a saturated solution of mannitol in said volatile solvent or mixture of volatile solvents and this saturated solution may also contain some suspended mannitol. When the spray dried mannitol particles obtained by the process of this invention are incorporated in tableting compositions they yield tablets having all of the desirable properties of tablets which include mannitol but the preparation of the granulations employed for said tablet compression operations is greatly simplified. The several special processing steps hitherto required in order to obtain adequate flow properties when mannitol is included in such granulations are reduced in number and in most instances are entirely eliminated.

Since the solvent is vaporized and removed during the spray drying operation any convenient solvent or mixture of solvents may be employed. Thus, water or ethyl alcohol, or mixtures of these solvents in various proportions may be used. Highly volatile solvents such as chloroform or carbon tetrachloride may also be used. In the event an organic solvent is used the recovery of the solvent becomes an economic factor in the process and, accordingly, water is usually preferred since no solvent recovery is required. Mannitol is quite soluble in water and by spraying a saturated aqueous solution of mannitol into air heated to a temperature of from 120 to 150° C. and preferably 200 to 250° C. or higher a very rapid volatilization of the water is effected leaving behind mannitol particles of an average particle size of from 5 to 150 microns in diameter. The air flow rate in the apparatus employed should be adjusted in relation to its temperature and to the liquid spray rate so that sufficient heat is provided to evaporate the solvent from the mannitol. This adjustment may be achieved by controlling the exit air temperature. In the case of water these variables are adjusted so that the exit air does not fall below a temperature of about 70° C.

While the spray dried mannitol thus obtained has improved flow properties and is satisfactory for use in tablet formulations, the compression qualities of the mannitol particles have been found to be greatly improved if the mannitol is spray-dried concurrently with various gums and film forming agents which are dissolved in the solvent employed so as to form a combination product. Gums or analogous materials which may be employed in the preparation of said combination products are, for example, methyl cellulose or ethyl cellulose, or natural gums such as guar gum, tragacanth or acacia. Polymeric materials such as polyvinylpyrrolidone, polyvinyl alcohol, polyvinyl acetate and other film forming substances such as gelatin are also suitable. The usual pharmaceutically acceptable waxes or waxy materials may also be employed including stearic acid, cetyl alcohol, hydrogenated castor oil and carnauba wax. When these agents are included, the mannitol is preferably spray dried from suspension in a solution in a volatile solvent of the film forming agent.

Using chloroform, for example, as the solvent for the film forming agents, air at room temperature may be employed and the cooling effect of the evaporation of the solvent will reduce the outlet air temperature about 5 to 10° C. below the inlet temperature. If slightly warmed inlet air at about 90 to 110° C. is used, outlet air temperature may be reduced by about 35 to 50° C.

The incorporation of gums soluble in the mannitol solution or suspension which is subjected to spray drying, as described, has the desirable effect of coating the mannitol particles and improving the binding properties of the spray-dried mannitol. Vaporization of the volatile solvent from a solution or suspension of mannitol which also includes a gum leaves a greater residue of solid upon evaporation thus producing a particle of greater diameter. The particular gum or film forming ingredient employed will, of course, depend upon the active therapeutic agent employed in the mannitol-modified formulation.

In order further to illustrate this invention the following examples are given:

*Example I*

181.8 grams of mannitol are dissolved in 1 liter of water and the solution impinged on the surface of a rotating wheel 2 inches in diameter and rotated at 35,000 r.p.m. contained in a drying tower through which air at 240° C. is being passed. The rotating wheel scatters the solution into fine particles and the water is evaporated by the heated air; the exit temperature of the air is about 110° C. The particle size distribution of the dried mannitol obtained varies from 5 to 150 microns. When incorporated into tableting formulas the mannitol imparts improved flow characteristics.

*Example II*

540 parts by weight of mannitol are dissolved and suspended in 500 parts by weight of water and the saturated aqueous suspension obtained is sprayed at room temperature into a column through which is passed a stream of air heated to a temperature of 230° C. The mannitol solution is sprayed by means of a rotating wheel as described above and the exit air temperature is maintained at 110° C. The water present in the spray is thus evaporated off and the dry mannitol particles remaining are collected by means of a suitable cyclone separator and, if necessary, a cloth filter. The mannitol particles may be employed directly in pharmaceutical tableting formulations and yields products with improved compression characteristics. When added to the usual pharmaceutical granulation or to dry pharmaceutical powder mixes, this spray-dried mannitol yields freely-flowing compositions.

*Example III*

500 grams of mannitol are suspended in 1 liter of a solution containing 10 grams of ethyl cellulose dissolved in chloroform. The chloroform suspension obtained is sprayed into a drying tower through which air at 110° C. is being passed, the spray being formed by use of a rotating wheel as described. Due to the cooling effect on evaporation of the chloroform combined with the rate of air flow the exit temperature of the air is 60° C. The finely divided ethyl cellulose coated mannitol particles obtained range in particle size from 5 to 150 microns. The free flowing powder obtained may be formulated into tableting compositions and imparts improved flow and compression characteristics.

*Example IV*

500 grams of mannitol are suspended in a solution of 10 grams of polyvinylpyrrolidone dissolved in 1 liter of chloroform and the resulting suspension is spray dried as described in Example III. The spray dried mannitol particles exhibit improved flow and compression characteristics.

*Example V*

500 grams of mannitol are added to 1.0 liter of water containing 1.25% by weight of methyl cellulose. On agitation a suspension of mannitol in a saturated aqueous solution is obtained. This aqueous suspension is then spray dried in a drying tower employing a rotating wheel to form the spray and employing air at an inlet temperature of 240° C. to effect the drying. The air leaves the tower at a temperature of 118° C. The dry coated mannitol particles exhibit improved flow characteristics and substantially improved compression characteristics over the usual commercial mannitol.

*Example VI*

The procedure of Example V is repeated except that ½ the amount of methyl cellulose is employed. The resulting mannitol particles exhibit substantially improved flow and compression characteristics.

*Example VII*

500 grams of mannitol are suspended in 1 liter of chloroform in which has been dissolved 10 grams of hydrogenated vegetable oil. This suspension is then spray dried as described in Example III and a product having improved flow and compression characteristics is obtained. The particle size distribution varies from 5 to 150 microns.

*Example VIII*

500 grams of mannitol are suspended in 1 liter of chloroform in which has been dissolved 10 grams of hydrogenated vegetable oil and 10 grams of ethyl cellulose. This suspension is then spray dried as described in Example III and a product having improved flow and compression characteristics is obtained. The particle size distribution varies from 5 to 150 microns.

*Example IX*

500 grams of mannitol are suspended in 1 liter of chloroform in which has been dissolved 10 grams of hydrogenated vegetable oil and 20 grams of ethyl cellulose. This suspension is then spray dried as described in Example III. The spray dried powder exhibits excellent flow and compression characteristics.

*Example X*

500 grams of mannitol are suspended in 1 liter of chloroform in which has been dissolved 10 grams of carnauba wax. This suspension is sprayed into a drying tower through which air at about 70° C. is being passed, the spray being formed by use of a rotating wheel as described. The liquid feed rate is adjusted so that the outlet air temperature is approximately 30 to 50° C. The finely divided carnauba wax coated mannitol obtained ranges in particle size from 5 to 150 microns. This spray dried powder exhibits improved flow and compression characteristics.

*Example XI*

500 grams of mannitol are suspended in 1 liter of chloroform in which has been dissolved 10 grams of ethyl cellulose and 5 grams of stearic acid. This suspension is then spray dried as described in Example X. The spray dried powder exhibits improved flow and compression characteristics.

The following ingredients are combined by simple blending procedures and then compressed on a rotary tablet press into tables of the size indicated.

*Example XII*

Folic acid tablets:  Per tablet, mg.
    Folic acid, U.S.P. _____ 5
    Glycine _____ 5
    Magnesium stearate _____ 0.5
    Stearic acid _____ 0.5
    Add enough spray dried mannitol, Example V or VI (above), to make 100 mg.

Example XIII

Ascorbic acid tablets:               Per tablet, mg.
    Ascorbic acid _____ 25
    Glycine _____ 5
    Magnesium stearate _____ 0.5
    Stearic acid _____ 0.5
    Add enough spray dried mannitol, Example V or VI (above), to make 100 mg.

Example XIV

Phenobarbital tablets:               Per tablet, mg.
    Phenobarbital, U.S.P. _____ 15
    Glycine _____ 5
    Magnesium stearate _____ 0.5
    Stearic acid _____ 0.5
    Add enough spray dried mannitol, Example V or VI (above), to make 100 mg.

Example XV

Riboflavin tablets:                  Per tablet, mg.
    Riboflavin _____ 2
    Glycine _____ 5
    Magnesium stearate _____ 0.5
    Stearic acid _____ 0.5
    Add enough spray dried mannitol, Example V or VI (above), to make 100 mg.

Example XVI

PETN tablets:                     Per tablet, mg.
    Pentaerythrityl tetranitrate (1 plus 5 dilution in sugar) _____ 50
    Glycine _____ 5
    Magnesium stearate _____ 0.5
    Stearic acid _____ 0.5
    Add enough spray dried mannitol, Example V or VI (above), to make 200 mg.

Example XVII

Aspirin tablets:                  Per tablet, mg.
    Aspirin, U.S.P. _____ 75
    Glycine _____ 5
    Magnesium stearate _____ 0.5
    Stearic acid _____ 0.5
    Add enough spray dried mannitol, Example V or VI (above), to make 300 mg.

Example XVIII

Tasteless niacinamide tablets:       Per tablet, mg.
    Niachinamide spray congealed in hydrogenated castor oil and stearic acid, 33⅓% active ingredient _____ 45½
    Glycine _____ 5
    Magnesium stearate _____ 0.5
    Stearic acid _____ 0.5
    Add enough spray dried mannitol, Example V or VI (above), to make 200 mg.

Example XIX

Tasteless niachinamide tablets:      Per tablet, mg.
    Hoffman La Roche "Rocoat" tastless niacinamide _____ 20
    Glycine _____ 5
    Magnesium stearate _____ 0.5
    Stearic acid _____ 0.5
    Add enough spray dried mannitol, Example V or VI (above), to make 200 mg.

Example XX

Phenelzine tablets:                 Per tablet, mg.
    Phenelzine spray dried with ethyl cellulose (equiv. to 15 mg. of phenelzine base) _____ 37
    Guar gum _____ 2.2
    PVP _____ 4.4
    Magnesium stearate _____ 2.2
    Add enough spray dried mannitol, Example V or VI (above), to make 220 mg.

Example XXI

Phenelzine tablets:                 Per tablet, mg.
    Phenelzine sulfate (equiv. to 15 mg. of phenelzine base) _____ 37
    Guar gum _____ 2.2
    PVP _____ 4.4
    Magnesium stearate _____ 2.2
    Add enough spray dried mannitol, Example IX (above), to make 200 mg.

Example XXII

Phenelzine Tablets:                 Per tablet, mg.
    Phenelzine sulfate (equiv. to 15 mg. of phenelzine base) _____ 37
    Guar gum _____ 2.2
    PVP _____ 4.4
    Magnesium stearate _____ 2.2
    Add enough spray dried mannitol, Example III (above), to make 220 mg.

Example XXIII

Dextromethorphan tablets:           Per tablet, mg.
    Dextromethorphan hydrobromide _____ 10.0
    Glycine _____ 5
    Magnesium stearate _____ 0.5
    Stearic acid _____ 0.5
    Add enough spray dried mannitol, Example V or VI (above), to make 100 mg.

Example XXIV 25.8 grams of phenelzine sulfate, 174.2 grams of mannitol and 60 grams of ethyl cellulose (10 cps. viscosity) are added to 1 liter of chloroform and the mixture then spray dried as described in Example III. The free flowing powder obtained may be tableted directly on a high speed rotary tablet press without any further treatment or processing.

It is understood that the foregoing detailed description is given merely by way of illustration and that many variations may be made therein without departing from the spirit of our invention.

Having described our invention, what we desire to secure by Letters Patent is:

1. In the method of forming mannitol into tablet binder particles having an average diameter of from 5 to 150 microns for subsequent compression tableting in combination with a medicament, the improvement which consists essentially of the steps of forming a solution of mannitol, spray-drying said solution of mannitol in the form of finely divided particles into a stream of heated inert gas, and separating the dry mannitol particles.

2. A compressed pharmaceutical tablet containing at least one powdered medicament, and mannitol of an average particle size of from 5 to 150 microns produced by compressing an admixture of said powdered medicament with mannitol particles produced in accordance with claim 1.

3. The method of forming film-coated mannitol into tablet binder particles having an average diameter of from 5 to 150 microns for subsequent compression tableting in combination with a medicament, the improvement which consists essentially of the steps of forming a solution of mannitol having at least one nontoxic film-forming material incorporated therein, spray-drying said solution of mannitol in the form of finely divided particles into a stream of heated inert gas, and separating the dry film-coated mannitol particles.

4. The method of claim 3 wherein the nontoxic film-forming material is a wax.

5. The method of claim 3 wherein the nontoxic film-forming material is a gum.

6. The method of claim 3 wherein the nontoxic film-forming material is methyl cellulose.

7. The method of claim 3 wherein the nontoxic film-forming material is a ethyl cellulose.

8. A compressed pharmaceutical tablet containing at least one powdered medicament, and film-coated mannitol of an average particle size of from 5 to 150 microns produced by compressing an admixture of said powdered medicament with film-coated mannitol particles produced in accordance with claim 3.

References Cited in the file of this patent

UNITED STATES PATENTS

| | | |
|---|---|---|
| 1,826,701 | Ames et al. | Oct. 13, 1931 |
| 2,433,849 | Lathrop et al. | Jan. 6, 1948 |
| 2,579,944 | Marshall | Dec. 25, 1951 |
| 2,596,939 | Nielsen et al. | May 13, 1952 |
| 2,648,609 | Wurster | Aug. 11, 1953 |
| 2,685,537 | Dunmire | Aug. 3, 1954 |
| 2,740,723 | Voris | Apr. 3, 1956 |
| 2,770,553 | Weidenheimer et al. | Nov. 13, 1956 |
| 2,799,241 | Wurster | July 16, 1957 |
| 2,807,559 | Steiner | Sept. 24, 1957 |
| 2,843,583 | Voris | July 15, 1958 |
| 2,893,871 | Griffin | July 7, 1959 |
| 2,900,256 | Scott | Aug. 18, 1959 |
| 2,944,029 | Jones et al. | July 5, 1960 |
| 2,977,203 | Sienkiewicz et al. | Mar. 28, 1961 |
| 2,986,475 | Mesnard et al. | May 30, 1961 |
| 2,995,773 | Gidlow et al. | Aug. 15, 1961 |
| 2,998,391 | Jones et al. | Aug. 29, 1961 |
| 3,009,826 | Straughn et al. | Nov. 26, 1961 |
| 3,012,893 | Kremzner et al. | Dec. 12, 1961 |
| 3,079,303 | Raff et al. | Feb. 26, 1963 |
| 3,084,104 | Tuerck et al. | Apr. 2, 1963 |
| 3,089,824 | Wurster | May 14, 1963 |

FOREIGN PATENTS

| | | |
|---|---|---|
| 809,662 | Great Britain | Feb. 25, 1959 |

OTHER REFERENCES

"Mannitol, N.F. as a Base in Press-Coated and Multi-Layer Tablets," pp. 1–9, published August 1959 by Atlas Powder Co., Wilmington, Delaware.